United States Patent [19]
Smith

[11] Patent Number: 5,498,270
[45] Date of Patent: Mar. 12, 1996

[54] SULFUR TRAP

[76] Inventor: Strom W. Smith, 18502 Cherrytree Grove Dr., Houston, Tex. 77084

[21] Appl. No.: 304,757

[22] Filed: Sep. 12, 1994

[51] Int. Cl.⁶ .................................................. B01D 35/18
[52] U.S. Cl. ................................. 55/216; 55/219; 55/269; 96/155
[58] Field of Search .......................... 55/215, 216, 218, 55/219, 267–269; 96/155, 128

[56] References Cited

U.S. PATENT DOCUMENTS

| | | | |
|---|---|---|---|
| 1,899,988 | 3/1933 | Ruemelin | 55/219 |
| 2,849,079 | 8/1958 | Evans | 55/218 X |
| 3,592,122 | 7/1971 | Hughes | 55/267 X |
| 4,035,158 | 7/1977 | Scott et al. | 423/574 X |
| 4,085,199 | 4/1978 | Singleton et al. | 423/574 |
| 4,117,100 | 9/1978 | Hellmer et la. | 423/574 X |
| 4,225,408 | 3/1981 | Sims | 423/574 |
| 4,341,753 | 7/1982 | Mori et al. | 423/574 X |
| 4,391,791 | 7/1983 | Palm et al. | 55/269 X |
| 4,504,459 | 3/1985 | Strothers | 423/574 X |
| 5,185,140 | 2/1993 | Kvasnikoff et al. | 423/574 |

FOREIGN PATENT DOCUMENTS

| | | | |
|---|---|---|---|
| 0859867 | 12/1940 | France | 96/155 |
| 59-209628 | 11/1984 | Japan | 96/155 |

*Primary Examiner*—Robert Spitzer
*Attorney, Agent, or Firm*—Keeling Law Firm

[57] ABSTRACT

A sulfur trap includes a vertically-elongated upper chamber, a lower chamber, a segregating wall, an orifice in the segregating wall, an upwardly extending hollow cylinder adjacent the orifice, a sphere disposed in the upper chamber, the sphere engaging the upwardly extending cylinder in a first position and the sphere floating in the molten sulfur contained in the upper chamber in a second position. An external shell is provided around the upper and lower chambers for circulating steam in the annular space between the shell and the upper and lower chambers.

16 Claims, 3 Drawing Sheets

SULFUR TRAP

DESCRIPTION OF THE INVENTION

1. Field of the Invention

The present invention relates to equipment for separating molten sulfur from associated gases in industrial operations producing molten sulfur, such as oil refineries.

2. Background of the Invention

Gaseous compounds containing sulfur, such as hydrogen sulfide, mercaptans, carbonyl sulfide, carbon disulfide, exist in natural gas. Such gaseous compounds are produced as by-products in petroleum refining operations.

In industrial applications, gas streams containing sulfur compounds are processed to remove sulfur (primarily in the form of hydrogen sulfide). The gas streams are then further processed to form liquid sulfur in sulfur recovery units.

Conventional sulfur recovery units include a seal leg or trapping device to separate molten sulfur from the gas stream. The molten sulfur is condensed from the remaining gas stream.

The discharge into the atmosphere of residual tail gases associated with such molten sulfur, such as sulfur dioxide and hydrogen sulfide, is environmentally unacceptable. It is therefore necessary to separate the elemental sulfur from the tail gases associated therewith.

Sulfur traps associated with sulfur recovery units, as conventionally designed, include two concentrically arranged vertical pipes. The vertical pipes may extend approximately twenty feet to twenty-five feet into the ground. The outer pipe is capped at its lower end. The inner pipe lower end is displaced above the capped lower end of the outer pipe allowing molten sulfur to flow from the inner pipe to the annular space between the pipes. Molten sulfur is received into the inner pipe, flows downwardly from the inner pipe and upwardly in the annular space between the inner pipe and the outer pipe to a discharge pipe connected to the outer pipe. The discharge pipe transmits the sulfur into a sulfur storage tank where the sulfur may be maintained until pumped out for shipping or other disposition. A jacket is provided outside the outer pipe, with steam circulated between the jacket and the outer pipe to maintain the temperature of the sulfur trap above 250° Fahrenheit and accordingly to maintain the sulfur in a liquid phase. The annular arrangement of the inner pipe and outer pipe provides a liquid trap preventing tail gases from being transferred in the storage tank.

Kuvasnikoff et al. U.S. Pat. No. 4,185,140, Sims U.S. Pat. No. 4,255,408 and Singleton et al. U.S. Pat. No. 4,085,199 disclose processes for removing sulfur and sulfur compounds from sulfur bearing gases.

Stothers U.S. Pat. No. 4,504,459 discloses process and apparatus for extraction of elemental sulfur from sulfur compound gases.

Mori et al. U.S. Pat. No. 4,341,753 and Hellmer et al. U.S. Pat. No. 4,117,100 disclose processes and apparatus for converting sulfur dioxide and gas to sulfur.

Scott et al. U.S. Pat. No. 4,035,158 discloses a process and apparatus for burning hydrogen sulfide and other combustible fluids to recover sulfur.

Conventional in-ground sulfur traps require ground excavation and buried lines to install the concentric piping, the steam jacket and steam lines. In operation, the inner pipe or the annulus may become blocked or partially blocked from time to time by materials such as contaminated sulfur, carbon, catalyst dust, etc. To remove the blockage it is often necessary that the trap be partially disassembled and the inner pipe or annulus rodded out to restore circulation.

Operating pressures upstream of the conventional in-ground sulfur traps must be limited due to the nature of the liquid trap. Other disadvantages of conventional sulfur seal systems are that they extend 20' or more into the earth, and that they are not easily cleaned.

It is an object of the present invention to provide an improved sulfur sealing system for providing effective separation of elemental molten sulfur from associated tail gases.

It is an object of the present invention to provide a sulfur sealing system that provides an effective seal while allowing process operation at relatively high pressures upstream of the seal.

It is a further object of the present invention to provide an improved sulfur sealing system that does not require deep excavation.

It is a further object of the present invention to provide an improved sulfur sealing system that provides relatively easy access for cleaning.

The sulfur trap of the present invention comprises generally a vertically-elongated upper chamber for receiving molten sulfur together with sulfur containing gases, a lower chamber disposed below the upper chamber, a wall segregating the lower chamber and the upper chamber, an orifice provided in the wall for fluid transfer from the upper to the lower chamber, an upwardly extending hollow cylinder adjacent the orifice wall, a sphere contained within the upper chamber, said sphere engaging the upwardly extending cylinder in a first position and said sphere floating in the molten sulfur contained in the upper chamber in a second position. Upon introduction of the molten sulfur into the upper chamber in sufficient quantities, the hydrostatic pressure of the molten sulfur displaces the sphere upwardly to allow molten sulfur to flow through the orifice into the lower chamber.

A discharge is fluidly connected to the lower chamber. An external shell is provided around the upper and lower chambers for circulating steam in the annular space between the shell and the upper and lower chambers to maintain the sulfur in a liquid phase.

DESCRIPTION OF THE PREFERRED EMBODIMENT

Figure 1:
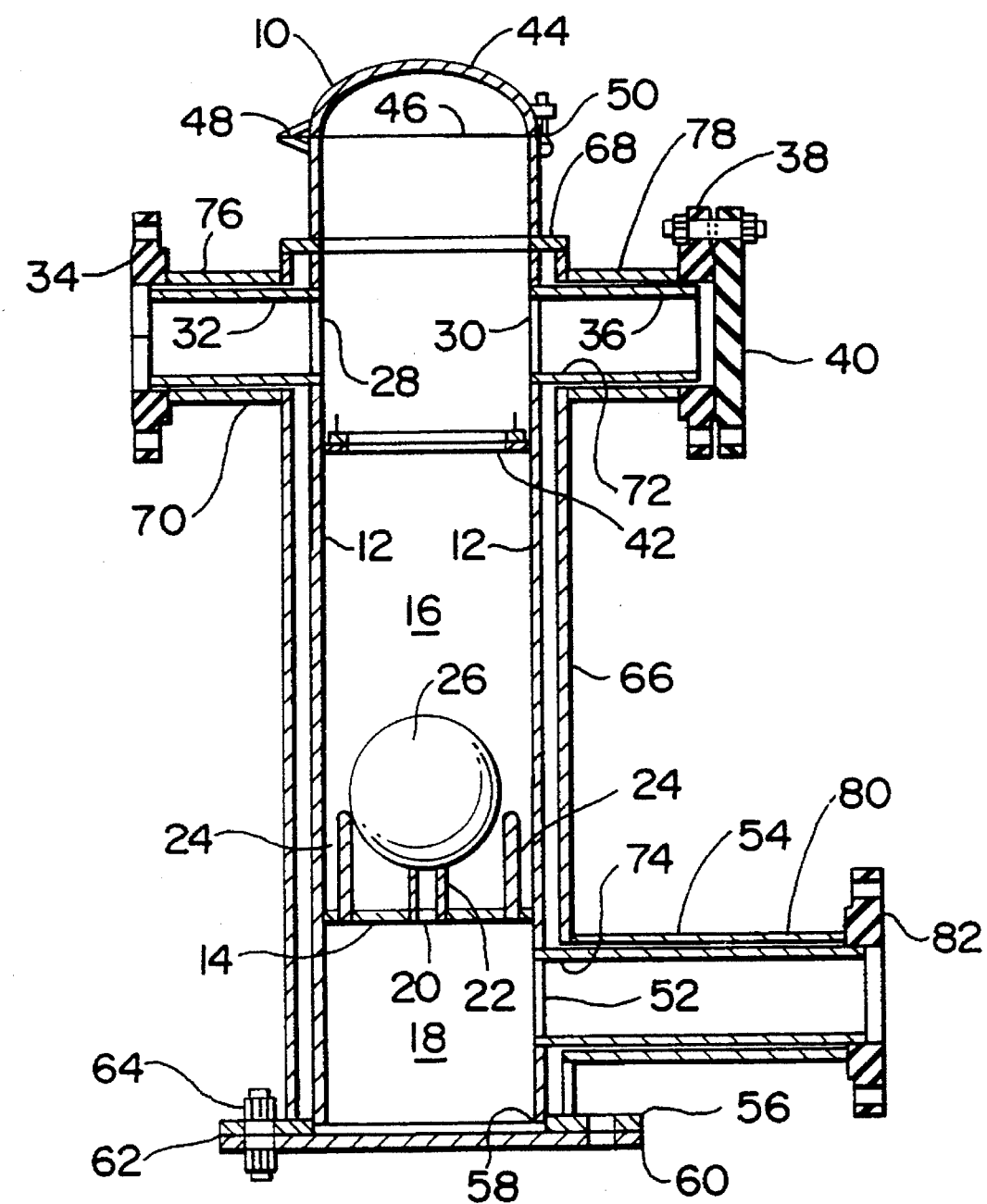
FIG. 1 depicts a cross-sectional view of the sulfur trap of the present invention along line 1—1 of FIG. 2.

Referring first to FIG. 1, the sulfur trap 10 of the present invention is depicted in a cross-sectional drawing. The sulfur trap 10 includes an elongated, vertically oriented, cylindrical wall 12 having a segregating plate 14 horizontally disposed therein, segregating plate 14 defining an upper chamber 16 and a lower chamber 18 within cylindrical wall 12. An orifice 20 is provided centrally of plate 14. An upwardly extending, cylindrical member 22 is attached to the plate 14, the hollow center of cylindrical member 22 aligned with the orifice 20 provided in segregating plate 14. Upwardly extending rods 24 are fixedly attached to plate 14 between the cylindrical member 22 and cylindrical wall 12.

A sphere 26 is disposed on the upper end of cylindrical member 22. As depicted in FIG. 1, the underside of sphere 26 engages the upper rim of cylindrical member 22 when sphere 26 is not floating in the molten sulfur.

Still referring to FIG. 1, an inlet orifice 28 is provided near the upper end of chamber 16 in cylindrical wall 12. Inlet orifice 28 is connected to inlet pipe 32. Inlet pipe 32 is connected to an inlet pipe flange 34. Inlet pipe flange 34 is connected to a condenser (not shown) or other source of molten elemental sulfur and associated sulfur-containing gases. Inlet pipe 32 provides fluid communication between upper chamber 16 and the condenser.

Still referring to FIG. 1, a second upper chamber orifice 30 is provided near the upper end of upper chamber 16 in cylindrical wall 12. Said second orifice 30 is connected to connecting pipe 36. Connecting pipe 36 is connected to connecting flange 38. As depicted in FIG. 1, connecting flange 38 is connected to a blind flange 40.

As depicted in the preferred embodiment, molten sulfur inlet to the sulfur trap 10 may be introduced into the sulfur trap 10 through inlet orifice 28 and inlet pipe 32. However, orifice 30 and connecting pipe 36 are provided for alternate inlet means of molten sulfur or for cleaning the sulfur inlet line connected to inlet pipe 32 of any solids deposited therein by using a straight rod.

A screen assembly 42 is disposed horizontally in upper chamber 16 below orifices 28 and 30. The screen is above and remote from segregating plate 14.

Still referring to FIG. 1, a rounded cap 44 is provided at the upper end of cylindrical wall 12. Cap 44 abuts the upper end 46 of cylindrical wall 12 around the circumference of wall 12. A hinge 48 is operatively connected to cap 44 and cylindrical wall 12 to allow cap 44 to be rotated about such hinge. A closure 50, comprising a flip top head in the preferred embodiment, is provided for attaching cap 44 to cylindrical wall 12 at a wall segment distal from the hinge 48.

Still referring to FIG. 1, a discharge orifice 52 is provided in cylindrical wall 12 near its lower end at lower chamber 18. A discharge pipe 54 is connected to discharge orifice 52. Discharge pipe flange 82 is connected to discharge pipe 54 at its end distal from discharge orifice 52.

Still referring to FIG. 1, a generally flat ring 56 is provided at the base of cylindrical wall 12. The exterior of cylindrical wall 12 and the inner side of flat ring 56 are connected throughout the circumference of cylindrical wall 12. A flat plate 60 is provided at the lower end 58 of cylindrical wall 12, said flat plate 60 engaging the underside of flat ring 56 and the end 58 of cylindrical wall 12. A gasket 62 and a plurality of bolts 64 are provided for fixed connection of ring 56 with plate 60, thereby providing sealing contact between ring 68 and plate 60.

Figure 3:
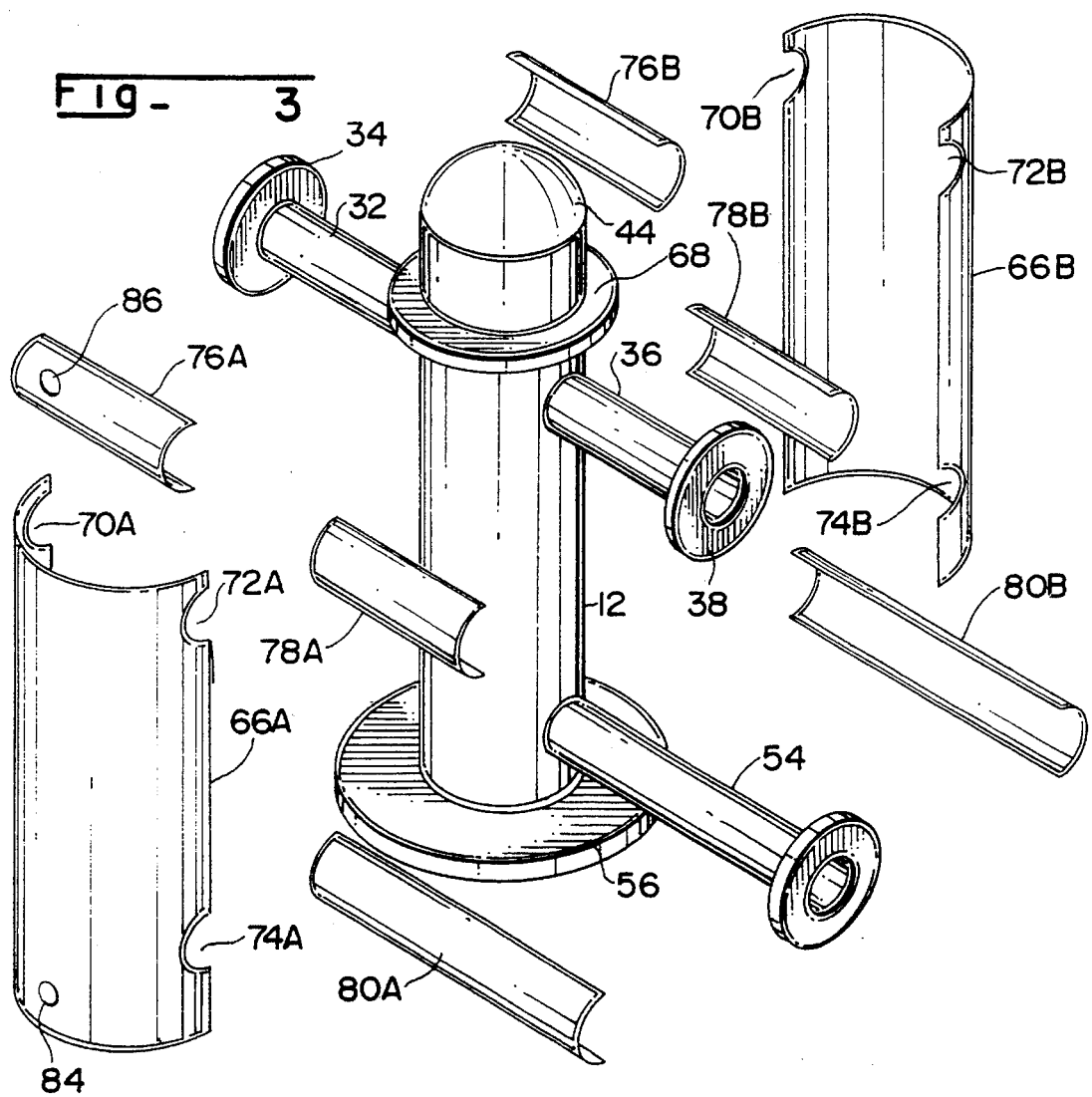
FIG. 3 depicts an isometric view of the sulfur trap of the present invention with shell components removed.

Referring now to FIG. 1 and FIG. 3, shell members forming a shell around the cylindrical wall 12, inlet pipe 32, connecting pipe 36 and connecting pipe 54 are disclosed. An outer cylindrical wall 66 comprising two joined semi-circular sections 66A and 66B extends around cylindrical wall 12, the cylindrical sections 66A and 66B each connected to flat ring 56 at their lower end and to a circumferentially extending upper ring 68 at their distal upper ends. In the preferred embodiment, such connections are by welding to provide sealed connection. As the inner diameter of cylindrical segments 66A and 66B exceeds the outer diameter of cylinder wall 12, an annular space is defined surrounding cylindrical wall 12. Circular openings 70, 72 and 74 are provided in outer cylindrical wall 66 for extension of inlet pipe 32, connecting pipe 36 and discharge pipe 34 respectively through cylindrical wall 66. The circular openings 70, 72 and 74 defined by adjoining semi-circular openings 70A and 70B, 72A and 72B and 74A and 74B respectively as depicted in FIG. 3.

Still referring to FIG. 1 and FIG. 3, a cylindrical sleeve 76, comprising segment 76A and segment 76B, extends around the circumference of inlet pipe 32. Segments 76A and 76B are joined to each other and are connected at one end to the outer cylindrical wall 66 and at the distal end to flange 34. Cylindrical sleeve 78, comprising joined segments 78A and 78B, extends circumferentially outside connecting pipe 36. The segments 78A and 78B are each connected at one end to outer cylindrical wall 66 and at the distal end to flange 38. In like manner, cylindrical sleeve 80, comprising joined segments 80A and 80B, is provided surrounding discharge pipe 54. Segments 80A and 80B are connected at a first end to outer cylindrical wall 66 and at a second distal end to flange 82.

It may be seen that outer cylindrical wall 66, upper flat ring 68, cylindrical sleeves 76, 78 and 80 and lower flat ring 56 define annular spaces surrounding cylindrical wall 12, inlet pipe 32, connecting pipe 36, and discharge pipe 54.

A steam inlet orifice 84 is provided in outer cylindrical wall 66. Steam inlet orifice 84 is provided with connecting means for connecting a steam inlet line to the outer cylindrical wall 66. The connecting means is not depicted as it is a conventional pipe connection. A steam outlet orifice 86 is provided in cylindrical sleeve 76. Steam outlet orifice 86 is provided with connecting means (not shown) for connecting outlet orifice 86 with a steam outlet line (not shown).

Figure 4:
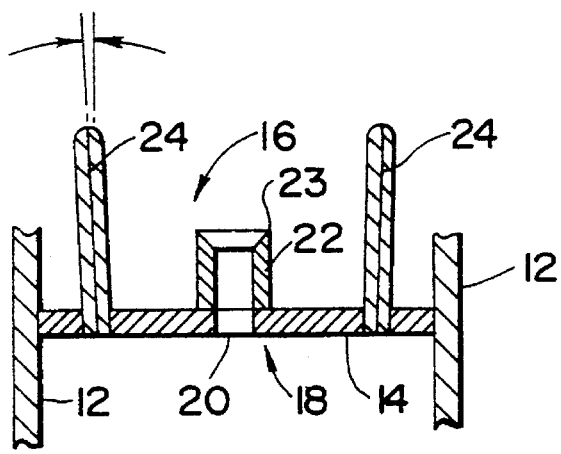
FIG. 4 depicts a cross-sectional view of the dividing wall segregating the upper and lower chambers.

Referring now to FIG. 4, details of construction of the segregating plate 14 are depicted. Segregating plate 14 comprises a generally circular plate connected to the interior surface of cylindrical wall 12 throughout the exterior circumference of the plate 14. Orifice 20 is centrally located in connecting plate 14. Cylindrical member 22 extends upwardly from plate 14 into upper chamber 16. The upper end 23 of cylindrical member 22 is provided with edges beveled outwardly, at an angle of approximately 45° in the preferred embodiment. The beveled edges create an upper edge 23 of outer wall 22, said upper edge 23 comprising a relatively small upper surface area. Absent an obstruction such as sphere 26, the orifice 20 and the interior of hollow cylindrical member 22 provide fluid communication between upper chamber 16 and lower chamber 18.

Still referring to FIG. 4, a plurality of rods 24, are connected to plate 14, said rods extending upwardly into upper chamber 16. Four rods 24 are provided in the preferred embodiment shown. Rods 24 are provided with rounded upper ends. Rods 24 are inclined outwardly at the upper ends. Rods 24 serve to center the sphere 26 over cylindrical member 22 and are sized and spaced accordingly.

Figure 5:
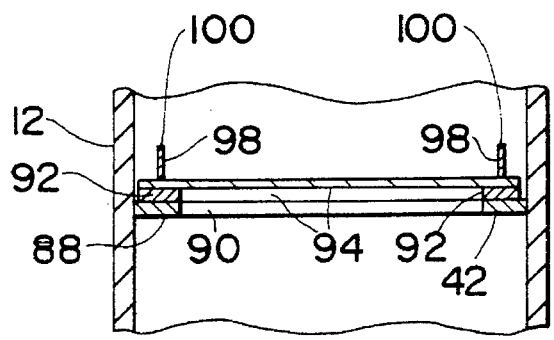
FIG. 5 depicts a cross-sectional view of the screen provided in the upper chamber.
Figure 6:
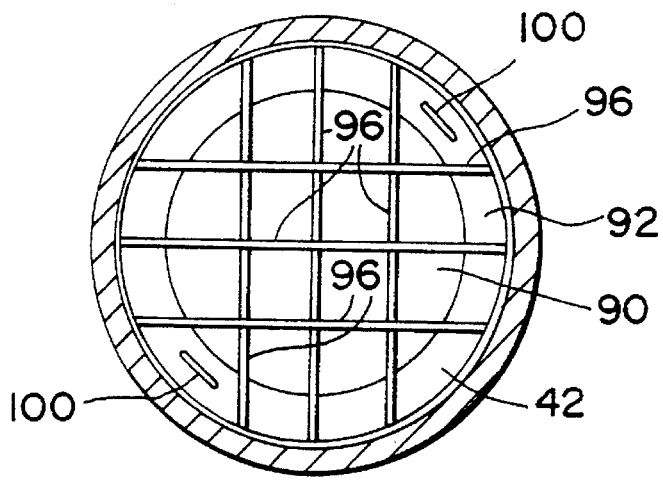
FIG. 6 depicts a plan view of the screen provided in the upper chamber.

Referring now to FIG. 5 and FIG. 6, details of the screen assembly 42 of the present invention are depicted. A generally flat cylindrical ring 88 is connected around its circumference to the cylindrical wall 12 below orifices 28 and 30 and vertically removed from segregating plate 14. Opening 90 is provided in flat ring 88. Flat ring 92, having an opening 94 generally coincident with opening 90, is provided adjacent to and above flat ring 88. A plurality of wires 96 are tack welded to the upper ring 92 and to each other at intersections. The wires intersect at right angles and create a coarse mesh for preventing the flow through openings 92 and 94 of large objects such as clumps of coagulated sulfur and sulfur compounds.

Still referring to FIG. 5 and FIG. 6, upwardly extending bars 98 are attached to flat ring 92. Horizontally-extending bars 100 are each attached to bars 98 to create lifting hooks on upper ring 92. Upper ring 92 may be raised from its position abutting lower ring 88 by gripping said bars 100.

OPERATION

Figure 2:
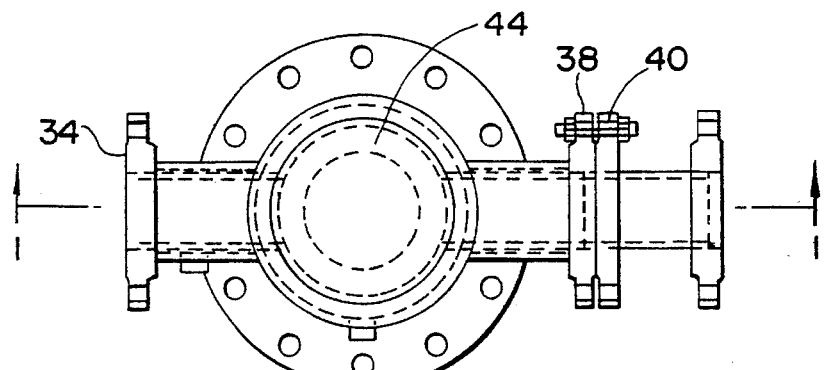
FIG. 2 depicts a plan view of the sulfur trap of the present invention.

Referring now to FIG. 2, the operation of the present invention is depicted. Molten sulfur is received into upper chamber 16 through inlet pipe 32, the molten sulfur containing tail gases including gaseous compounds containing sulfur, such as hydrogen sulfide, mercaptans, carbonyl sulfide, and carbon disulfide. Such molten sulfur is induced by gravity to flow through the screen assembly 42, where large particles, including coagulated clumps of sulfur and sulfur compounds, are segregated from the molten sulfur. As a volume of sulfur accumulates in the upper chamber 16, the sphere 26 is displaced upwardly from its resting place at the upper lip 23 of cylindrical member 22. The sphere is constructed with such an average density to float in molten sulfur. Such displacement of sphere 26 allows molten sulfur to flow through the orifice 20 into lower chamber 18 and thence through discharge pipe 54 to a storage tank or other receptacle.

The flow of molten sulfur into the lower chamber 18 continues during the period that sphere 26 is displaced from lip 23. A liquid seal is maintained during such flow by the liquid sulfur, preventing process gas from escaping with liquid sulfur to the lower chamber.

Upon reduction of volume of molten sulfur in upper chamber 16, sphere 26 drops to its original position at lip 23 of cylindrical member 22. Further flow of molten sulfur through orifice 20 is thereby terminated. The centering of sphere 26 on lip 23 is facilitated by rods 24, said rods 24 being so located and sized as to direct sphere 26 to the center of chamber 16. The relatively small surface area of lip 23 and the arcuate outer surface of sphere 26 provide an effective seal against such flow of molten sulfur.

Steam is continually circulated through the annular spaces surrounding cylindrical wall 12, inlet pipe 32, connecting pipe 36 and discharge pipe 54 to maintain the temperature within sulfur trap 10 above 250° Fahrenheit. The sulfur contained within sulfur trap 10 is thereby maintained in a liquid phase.

As required for cleaning and to remove coagulated sulfur material, cap 44 may be rotated about hinge 40 to an open position. The flat ring 92 and mesh wire 94 may then be removed from the upper chamber 16.

The foregoing description of the invention illustrates a preferred embodiment thereof. Various changes may be made in the details of the illustrated construction within the scope of the appended claims without departing from the true spirit of the invention. The present invention should only be limited by the claims and their equivalents.

I claim:

1. A sulfur trap for separating liquid sulfur from a gas stream comprising:

a vertically-extending body, having a wall that defines a generally vertical chamber;

a segregating wall disposed in said chamber;

said segregating wall defining an upper chamber and a lower chamber;

a first inlet in said upper chamber;

a circular orifice through said segregating wall;

a cylindrical member having a hollow cavity extending lengthwise therethrough;

said cylindrical member extending upwardly from said segregating wall into said upper chamber;

said cavity aligned with said orifice; and said cavity and said orifice providing fluid communication between said upper chamber and said lower chamber; and a sealing means for selectively allowing or preventing flow through said circular orifice.

2. A sulfur trap for separating liquid sulfur from a gas stream as claimed in claim 1 further comprising a discharge orifice in said lower chamber.

3. A sulfur trap for separating liquid sulfur from a gas stream as claimed in claim 2 wherein said sealing means comprises a sphere in said upper chamber.

4. A sulfur trap for separating liquid sulfur from a gas stream as claimed in claim 3 wherein:

said cylindrical member having an upper end;

said cylindrical member upper end and said sphere so sized and constructed that said sphere is sealingly engaged with said cylindrical member upper end in a first sealed position; and said sphere disengaged from said cylindrical member upper end in a second open position.

5. A sulfur trap for separating liquid sulfur from a gas stream as claimed in claim 4 wherein:

said cylindrical member upper end is beveled; and said beveled upper end creating an upper edge having a relatively small upper surface area.

6. A sulfur trap for separating liquid sulfur from a gas stream as claimed in claim 4 further comprising:

a plurality of rods extending upwardly from said segregating wall into said upper chamber; and said plurality of rods constructed and positioned about said fluid communication means to facilitate positioning of said sealing means on said fluid communication means.

7. A sulfur trap for separating liquid sulfur from a gas stream as claimed in claim 6 further comprising:

a shell that surrounds said sulfur trap;

said shell and said sulfur trap defining a space therebetween;

said shell constructed to sealingly contain a heated steam within said space;

a steam inlet in said shell; and a steam outlet in said shell.

8. A sulfur trap for separating liquid sulfur from a gas stream as claimed in claim 2 further comprising:

a first generally flat cylindrical ring;

said first ring positioned in said upper chamber below said first inlet and above said segregating wall;

said first ring connected around its circumference to said wall of said body;

an opening in said first ring permitting flow therethrough;

a second generally flat cylindrical ring;

said second ring supported by and positioned to removably rest on said first ring;

an opening in said second ring permitting flow therethrough;

said opening in said second ring substantially coincident with said opening in said first ring;

a plurality of wires connected to said second ring; and said plurality of wires intersecting one another to form a mesh to prevent large objects from passing therethrough.

9. A sulfur trap for separating liquid sulfur from a gas stream as claimed in claim 8 further comprising:

at least one lifting hook extending upwardly from said second ring; and said at least one lifting hook having an opening therein to facilitate removal of said second ring.

10. A sulfur trap for separating liquid sulfur from a gas stream as claimed in claim 2 further comprising:

an opening in an upper end of said body sized to provide access to said upper chamber;

a cap abutting said upper end;

a hinge means for rotatably connecting said cap to said body;

said cap selectively sealing said opening in said upper end in a first open position;

said cap selectively providing access to said upper chamber in a second closed position; and a closure means for selectively fixedly connecting said cap to said body distal said hinge means.

11. A sulfur trap for separating liquid sulfur from a gas stream as claimed in claim 2 further comprising:

a second inlet in said upper chamber;

said second inlet positioned distal said first inlet;

said first inlet and said second inlet having a common circular design; and said first inlet and said second inlet substantially aligned.

12. A sulfur trap for separating liquid sulfur from a gas stream comprising:

a vertically-extending body, having a wall that defines a generally vertical chamber;

a segregating wall disposed in said chamber;

said segregating wall defining an upper chamber and a lower chamber;

a first inlet in said upper chamber;

a fluid communication means provided in said segregating wall for facilitating fluid communication through said segregating wall between said upper chamber and said lower chamber;

a sealing means for selectively allowing or preventing flow through said fluid communication means;

a plurality of rods extending upwardly from said segregating wall into said upper chamber; and said plurality of rods constructed and positioned about said fluid communication means to facilitate positioning of said sealing means on said fluid communication means.

13. A sulfur trap for separating liquid sulfur from a gas stream as claimed in claim 12 wherein:

said plurality of rods having a plurality of rod upper ends distal said segregating wall; and said rod upper ends are rounded.

14. A sulfur trap for separating liquid sulfur from a gas stream as claimed in claim 13 wherein said plurality of rods are inclined outwardly at said upper ends.

15. A sulfur trap for separating liquid sulfur from a gas stream comprising:

a vertically-extending body, having a wall that defines a generally vertical chamber;

a segregating wall disposed in said chamber;

said segregating wall defining an upper chamber and a lower chamber;

a first inlet in said upper chamber;

a fluid communication means provided in said segregating wall for facilitating fluid communication through said segregating wall between said upper chamber and said lower chamber;

a sealing means for selectively allowing or preventing flow through said fluid communication means;

a temperature control means for maintaining a predetermined temperature in the sulfur trap;

wherein said temperature control means comprises:

a shell that surrounds said sulfur trap;

said shell and said sulfur trap defining a space therebetween;

said shell constructed to sealingly contain a heated steam within said space;

a steam inlet in said shell; and a steam outlet in said shell.

16. A sulfur trap for separating liquid sulfur from a gas stream as claimed in claim 15 wherein said temperature control means maintains the temperature in said sulfur trap above 250° Fahrenheit.

* * * * *